United States Patent

[11] 3,584,860

| [72] | Inventor | James Edwin Ervin |
| | | 116 East Peach, Angleton, Tex. 77515 |
| [21] | Appl. No. | 742,750 |
| [22] | Filed | July 5, 1968 |
| [45] | Patented | June 15, 1971 |

[54] BELT PIPE VISE
3 Claims, 6 Drawing Figs.

[52] U.S. Cl. .................................................. 269/131
[51] Int. Cl. .................................................. B25b 1/20
[50] Field of Search ........................................ 269/130–132; 81/64—66; 157/1.21; 248/231

[56] References Cited
UNITED STATES PATENTS

| 1,103,243 | 7/1914 | Amborn ........................ | 269/130 |
| 1,770,763 | 7/1930 | Wolfstyn ...................... | 269/131 X |
| 1,955,127 | 4/1934 | Heintz ......................... | 269/130 X |
| 2,521,189 | 9/1950 | Smythe et al. ................ | 269/131 |
| 2,693,015 | 11/1954 | Richards et al. ............. | 24/243 |
| 2,822,710 | 2/1958 | Haiman ....................... | 269/131 X |
| 3,334,864 | 8/1967 | Scott et al. .................. | 157/1.21 |

*Primary Examiner*—Lester M. Swingle
*Attorney*—Bernard A. Reiter

ABSTRACT: A flexible belt type of pipe vise for gripping plastic coated pipe or other workpiece so as not to damage or otherwise mar the surface. The clamping belt of the vise is adjustably mounted so as to vary its diameter by movement of an operating handle.

J. E. Ervin
INVENTOR.

BY Bernard A. Reiter

ATTORNEY

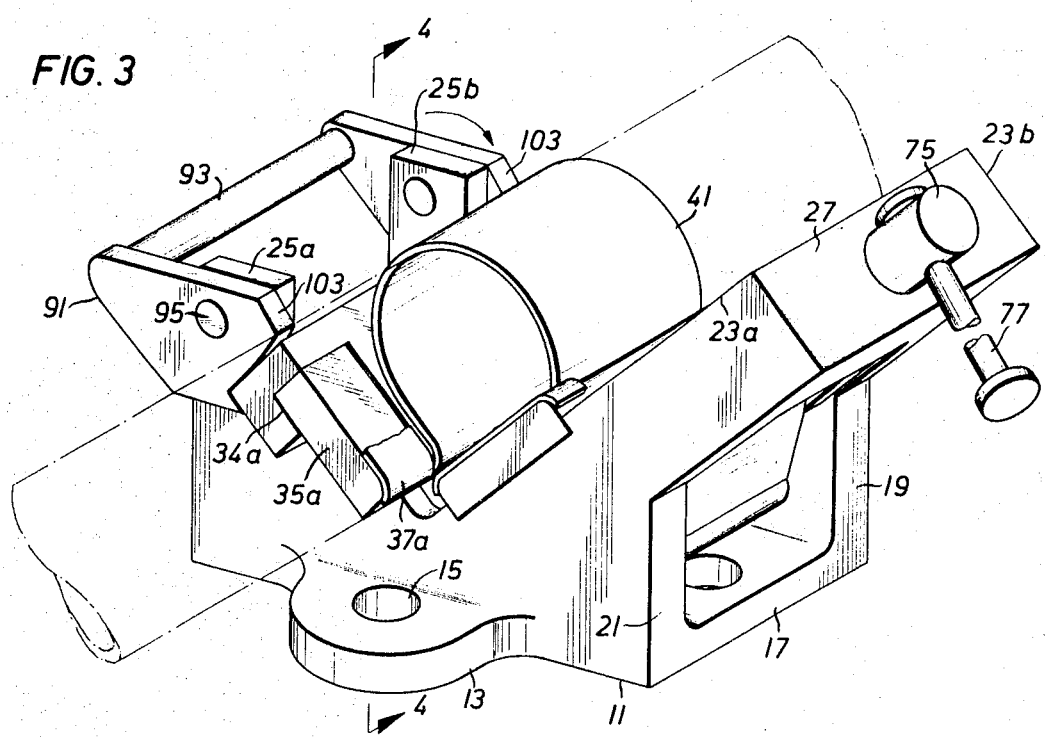
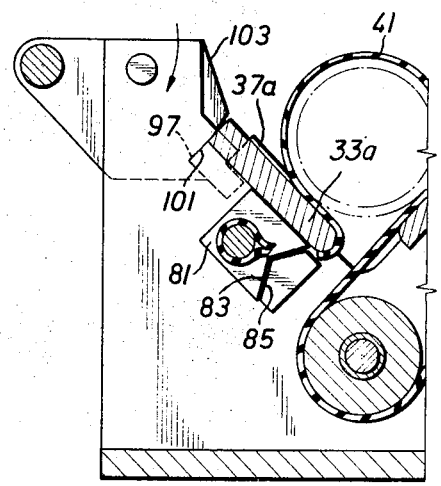
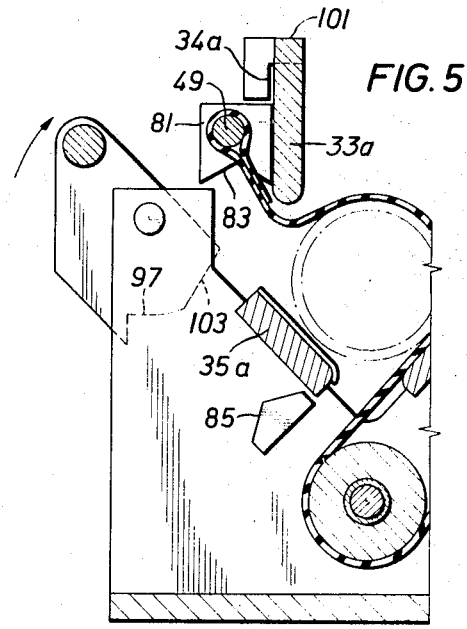
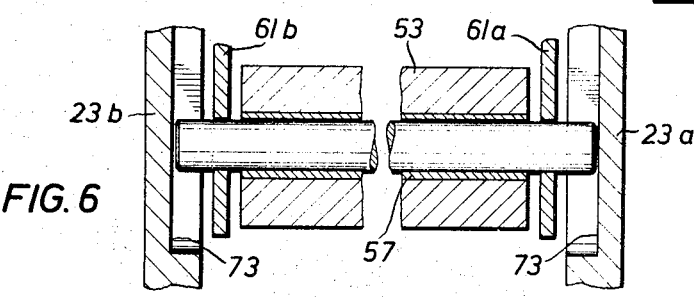

BELT PIPE VISE

BACKGROUND OF THE INVENTION

This invention relates to vises and more particularly to flexible belt type of pipe vises which are adapted to receive varying sizes of pipe or other workpieces and for holding them in fixed position while work is being performed thereon.

Heretofore, a variety of flexible belt pipe vises have been known in the prior art. Almost all of these devices are characterized by one or more deficiencies or disadvantages, not the least of which are an impositive or unstable gripping action structure, the necessity to slide the end of the pipe underneath the gripping belt rather than having the ability to merely lay the pipe within the belt, and inability to accept different-size workpieces for holding purposes, and complex mechanical arrangements which lead to high production and maintenance costs.

The present invention has as a primary objective thereof the provision for a flexible belt pipe vise which is capable of firmly engaging and immovably supporting pipe or other cylindrical workpiece of any of a multitude of sizes. This is accomplished by means of an improved multipoint support arrangement wherein the pipe is adapted to rest on spaced support plates between which extends the aforementioned flexible belt and which, when tightened, clamps the pipe down on to the plates so as to lock the pipe thereon, and thus provide a multipoint supporting structure. A further advantage of the invention resides in the provision for a flexible belt vise in which the belt ends are fixedly anchored by axle means at each end thereof but which is nevertheless provided with an improved tensioning mechanism for tightening the belt about the workpiece without the necessity to remove or in any way adjust the fixed position of the belt itself. Still another feature of the invention resides in a flexible belt type vise in which an end of the belt may be removed so as to permit the efficient insertion of the workpiece into the vise without having to back the workpiece to an end and thread it into the vise.

The accomplishment of the aforementioned objects and advantages is achieved by utilization of a double-S shaped flexible belt disposed within an appropriate frame means and fixed therein at each of the belt ends by a pair of anchor axles. The S-shaped configuration is maintained by a pair of belt pulleys, one of which is of fixed position and the other of which is movable engaged by an adjustable tensioning assembly. Simple movement of an operating handle causes correlative upward or downward movement of the movable belt pulley thereby expanding or contracting the length of belt about the workpiece so as to increase or decrease the clamping force.

These and numerous other features and advantages of the invention will become apparent upon a reading of the following detailed description, claims and drawings wherein like numerals denote like parts in the several views and wherein:

FIG. 3 is a perspective view of a modified form of the invention which the anchoring axle at one end of the belt is fixedly connected to a removable support plate.

FIG. 4 is a sectional view of the modified device of FIG. 3 along the plane 4-4 thereof.

FIG. 5 is a sectional view similar to FIG. 4 but in which the belt anchor axle and support plate are removed from their normal operating position so as to permit loading of a length of pipe into the vise.

FIG. 6 is a sectional view along the plane 6-6 of FIG. 2.

Figures 1, 2:
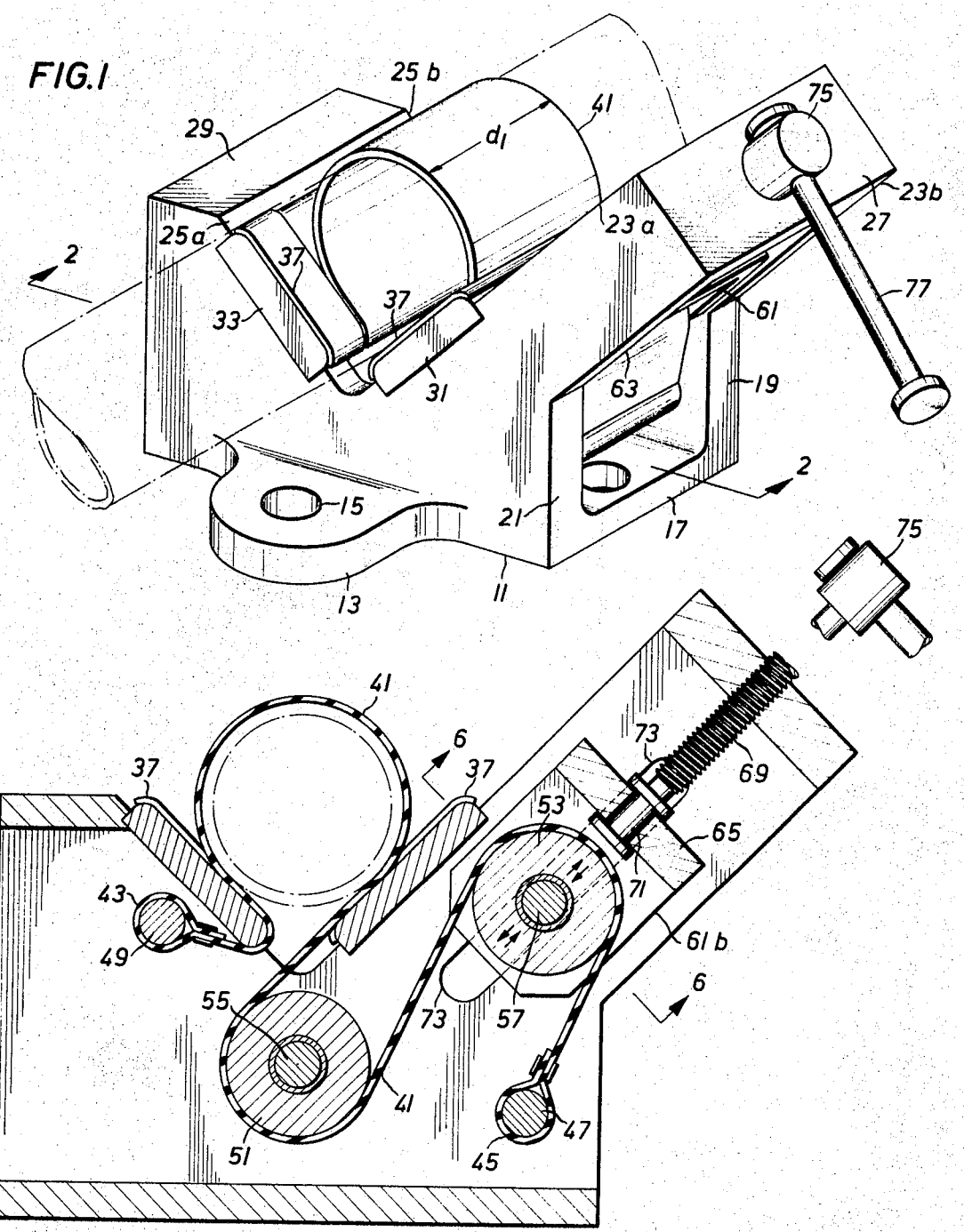
FIG. 1 is a perspective view of the flexible belt pipe vise of the invention as shown in preferred form.
FIG. 2 is a cross-sectional view of the vise of FIG. 1 along the plane 2-2 thereof.

With reference now to FIG. 1 there is shown the vise frame member 11 which may be made of machined or cast metal. The frame includes conventional flange means 13 extending from each side thereof, the flange means containing a bolthole 15 extending therethrough so that a bolt may be inserted in order to affix the frame to an appropriate workbench or other support means. The frame is further characterized by a horizontally disposed bottom wall 17 and a pair of upwardly extending sidewalls 19, 21. Each of the sidewalls are of generally planar configuration and have a V-shaped cutout portion therein across the upper surface so as to define a pair of extending legs 23a, b, and 25a, b. The legs 23a, b are connected across their upper end by faceplate 27 so as to generally form a frame arm section which is an integral part of the frame itself. Similarly, the legs 25a, b are connected by a faceplate 29 to form a frame arm section opposite the frame arm section formed by legs 23a, b, and faceplate 27.

Resting on the respective legs 23a, b, and 25 a, b, in the V-shaped cutout and forming a bridge thereacross are respective support plates 31, 33. These plates form the means of support for the pipe or other workpiece which is to be held in the vise. Fixedly attached to each end of each support plate 31, 33 such as by adhesive or other appropriate means is a friction pad 37 which may be made of thin rubber or similar synthetic material. The friction pad 37 may be approximately one-sixteenth to a quarter inch in thickness and a half inch or more in width. It is on these pads 37 that the workpiece actually rests when placed in the vise. The flexible belt 41 (see FIGS. 1 and 2) is to have a width $d$, which is less than the distance between the friction pads on each of the respective support plates, so that when the bet is tightened in the manner described hereinafter, the clamping action thereof forces the pipe firmly against the friction pads 37 rather than plates 31, 33 so that the pipe is, in effect, supported by the spaced pads on each of the respective support plates 31, 33. Thus, the workpiece is fixed in a four-point support (two per plate) rather than a single planar support and the clamping force is applied by the belt between the two supports on each plate so as to provide even distribution of the force thereon. Because of the two point clamping action on each plate movement of the workpiece is substantially precluded.

With reference now to FIG. 2, there is shown a sectional view of the vise of FIG. 1 illustrating the belt and the adjusting mechanism therefor. The belt may consist of a leather, rubber or synthetic laminated and/or vulcanized material having a relatively low modulus of elasticity and a high tensile strength characteristic. It is operatively disposed within the vise in a double-S configuration in which the ends 43, 45 are looped about a pair of fixed anchor axles 47, 49. The double-S configuration is imparted to the belt by a pair of approximately placed pulleys 51, 53, which rotate about axle means 55, 57 respectively. The axle 55 of lower pulley 51 fixedly engages the interior of sidewalls 19, 21 of the frame member. Pulley axle 57 is carried by a pair of opposed parallel collar walls 61, 63. The collar walls 61, 63 are connected to and carried by the collar baseplate 65 (See FIG. 2). The entire collar consisting of the baseplate 65 and the respective collar walls 61, 63 extending therefrom so as to form a U-shaped collar is adapted to move upwardly and downwardly in legs 23a, b by means of a threaded operating shaft 69 which fixedly engaged the collar base 65 through a connecting spool 71 in the center of collar baseplate 65. The opposite end of the operating shaft 69 threadedly engages the faceplate aperture 73 and extends therethrough into the shaft head 75. The head 75 contains a diametral bore through which slidably extends the vise-operating handle 77.

The collar base 65 having the parallel extending walls 61a, b thereon is guided in its movement upwardly and downwardly within the legs 23a, b by means of the axle 57 around which pulley wheel 53 rotates. The axle 57 (See FIG. 6) extends across and through the walls 61 of the collar and is carried thereby. The ends of the axle 57 extend into an elongated slot 73 (FIGS. 2 and 6) which resides in each of the interior surfaces of the legs 23a, b. It may thus be visualized that upon rotative manipulation of the operating handle 77 about head 75 the shaft 69 will rotate causing a correlative movement of the collar base 65 and walls 61 ($a$, $b$) either upwardly or downwardly, with the movement of said base and walls being guided by the movement of axle 57 within opposed slots 73.

With reference now to FIG. 3 there is shown a modified form of the flexible belt vise in which one of the belt anchor axles is removable. The efficiency of such an arrangement will be recognized when it is recognized that unusually long pieces of pipe or other stock normally have to be backed up until their end may be slid into the loop portion of the belt and then pushed an appropriate distance therethrough. In the modified vise it is unnecessary to back the pipe to its end to get it in the vise. Instead the belt end may be lifted out, the pipe laid down and the end replaced. It should be noted that the modified vise-tensioning mechanism is identical to that described hereinabove with respect to FIGS. 1 and 2. Likewise the configuration of the belt itself within the vise, the frame and support plates 31, 33 and friction pads 37 are identical. The difference resides in the provision for a removable anchor axle, this being accomplished by the unitary construction of the anchor axle on the removable support plate 33a. The removable support plate 33a includes a cutout section or shoulder portion 34a at each end thereof into which is adapted to cooperatively fit the base 35a of friction pads 37a. A base 35a is fixedly connected to each of the legs 25 a, b of frame 11, as best shown in FIGS. 4 and 5. The support plate 33a extends entirely across the width of the frame and is characterized by a locking leg 81 at each end which extends perpendicularly to the plate. The locking legs 81 (only one being shown) are characterized by a keyed surface 83 (FIGS. 4 and 5) which is adapted to engage a cooperating surface 85 that is permanently affixed to the interior of each of the walls 19, 21. The locking legs are further characterized by a bore extending therethrough which is adapted to receive the anchor axle 49 in the manner described above. It may be seen that the locking legs 81 and cooperating structure 85 are adapted to engage each other on the internal surface of the sidewalls 19, 21 while the shoulder portion 34a of plate 33a is simultaneously adapted to engage the bottom surface of the pad support plate 35a exteriorly of the sidewalls. In this manner the removable support plate and belt axle 49 are firmly locked against lateral movement.

Fixing of the removable plate is accomplished by locking frame 91. The lock 91 is rotatably supported on legs 25a, b by pivot means 95. Handgrip 93 enables movement of the lock about the pivots in a manner permitting the engagement or disengagement of cammed face 97 (see FIGS. 4 and 5) with the back surface 101 of the removable plate. Complete unlocking of the plate is facilitated by the relieved face 103, see FIG. 5.

As best shown in FIGS. 2, 4, and 5, the belt is first threaded from the belt axle 49 around the longitudinal edge of the support plate 33 and into a looping configuration, the size of the loop being governed by the relative position of the adjusting or tensioning assembly 69, 65, 61, 53. The loop of the belt 41 extends downwardly across the surface of support plate 31 and around the fixed pulley 51. From pulley 51 the belt extends in clockwise direction over the adjustable pulley 53 and into fixed engagement with the anchor axle 47.

In operation of the embodiment of FIG. 1, it may be readily visualized that the pipe or other workpiece is inserted through the loop of belt 41 and moved to an appropriate position therein so that the cutting or other operation may be performed. If the modified form of the invention is used (FIG. 4 ) the support plate 33a is first removed from the vise by unlocking its fixed position via rotation of the locking frame 91. This is done by rotating the locking frame with grip handle 93 on a clockwise manner about pivot means 95, see FIGS. 4 and 5. In this manner the locking frame face 97 moves from a locked position (FIG. 4) to an unlocked position (FIG. 5) and permits the cooperating means 83, 85 to be disengaged, thus further permitting the locking faces 34a to be disengaged from the support plate 35a. The entire support plate and belt assembly end may thus be removed from the vise by moving it backwardly toward the locking frame and by lifting upwardly. The pipe is then merely laid upon the support plate 34a. After the pipe has been laid upon the support plate the removable plate and belt assembly is reinserted against the abutting shoulder of friction pad plate 35a with the cooperating means 83, 85 engaging one another. The locking frame 91 is then rotated in a counterclockwise manner so that locking frame face 97 is adapted to engage backface 101 of plate 33a. Tightening of the adjustable belt vise is accomplished in the same manner regardless of whether or not the belt axle is of the fixed or removable variety. This, as previously explained, is accomplished by rotation of the operating handle in order to cause upward or downward movement of the threaded shaft thus causing concomitant tightening or loosening of the loop about the workpiece.

It will be readily recognized and understood that the forms of the invention described herein and shown in the accompanying drawings are to be considered as preferred and suggested examples of the same and that numerous and varied other changes in the shape, size and arrangement of the parts may be resorted to without departing from the spirit of the invention and the scope of the subjoined claims.

Therefore, that which I claim and which I desire to be secured by United States Letters Patent is:

1. A flexible belt vise for securing a workpiece firmly but without detriment to the surface thereof comprising:
 a frame member having supporting wall means for receiving the workpiece,
 belt means having first and second ends and a looped portion intermediate thereof which is adapted to receive and engage the workpiece, the ends of said belt means being connected to axles fixedly supported by the frame, and an adjustment assembly operatively associated with the frame and belt means for varying the size of the looped portion, said adjustment assembly including a pair of spaced parallel outwardly extending legs, each of said legs having an aligned aperture therein for receiving an axle which supports collar walls, said legs being connected to one another at their outward ends by a faceplate to thereby form a frame arm section,
 a collar baseplate disposed within said frame arm section having extending collar walls integral thereto and disposed parallel to said outwardly extending legs,
 a pulley axle carrying said belt means and carried by said extending collar walls in perpendicular relation thereto, said pulley axle movably engaging the apertures in each said leg so as to thereby provide for movement of the collar walls and collar baseplate therealong, and
 an operating shaft affixed to said collar base for selectively moving the base in either of two opposing directions so as to thereby expand or diminish the diameter of the looped portion of the belt means.

2. The flexible belt vise of claim 1 wherein said frame member wall means is characterized by a plurality of spaced raised portions for contacting and supporting the workpiece, said looped portion being disposed intermediate said raised portions so that upon reduction of the loop diameter toward the wall means the compressive force applied by the belt on the workpiece is borne by said raised portions.

3. The flexible belt vise of claim 1 wherein one of the axles supported by said frame is removably affixed to the frame by a removable plate, said removable plate carrying said axle,
 a locking arm means rotatably affixed to the frame being characterized by a cammed surface which is adapted to be rotated into locking engagement with the plate thereby providing for the opening of the loop in the belt in order to facilitate insertion of large-size pipe.